United States Patent
Disdier et al.

(10) Patent No.: US 7,238,951 B2
(45) Date of Patent: Jul. 3, 2007

(54) TWO-DIMENSIONAL IONISING PARTICLE DETECTOR

(75) Inventors: Laurent Disdier, Saint-Remy les Chevreuse (FR); Alexandre Fedotoff, Saint Cheron (FR)

(73) Assignee: Commissariat A L'Energie Atomique, Paris (FR)

( * ) Notice: Subject to any disclaimer, the term of this patent is extended or adjusted under 35 U.S.C. 154(b) by 166 days.

(21) Appl. No.: 10/506,606

(22) PCT Filed: Mar. 24, 2003

(86) PCT No.: PCT/FR03/00919

§ 371 (c)(1),
(2), (4) Date: Sep. 10, 2004

(87) PCT Pub. No.: WO03/081279

PCT Pub. Date: Oct. 2, 2003

(65) Prior Publication Data

US 2005/0161611 A1 Jul. 28, 2005

(30) Foreign Application Priority Data

Mar. 26, 2002 (FR) .................................. 02 03749

(51) Int. Cl.
*G01T 3/06* (2006.01)
*G01T 1/20* (2006.01)
(52) U.S. Cl. ................... 250/390.11; 250/361 R
(58) Field of Classification Search ............ 250/361 R, 250/390.11
See application file for complete search history.

(56) References Cited

U.S. PATENT DOCUMENTS

| 4,359,641 | A | * | 11/1982 | Franks et al. ............ 250/486.1 |
| 4,686,695 | A | * | 8/1987 | Macovski ................... 378/146 |
| 5,135,679 | A | | 8/1992 | Mirsky |
| 5,859,946 | A | * | 1/1999 | Wojcik et al. .............. 385/125 |
| 5,864,146 | A | * | 1/1999 | Karellas ..................... 250/581 |
| 6,388,260 | B1 | * | 5/2002 | Doty et al. ............ 250/390.01 |
| 2005/0105665 | A1 | * | 5/2005 | Grodzins et al. ........... 376/157 |

FOREIGN PATENT DOCUMENTS

| EP | 0 899 588 | 3/1999 |
| FR | 2 555 321 | 5/1985 |

OTHER PUBLICATIONS

Bay, Aurelio and Martellotti, Giuseppe; Capillary Detectors in LHC-B, Dec. 21, 1996, Nuclear Instruments and Methods in Physics Research Section A: Accelerators, Spectrometers, Detectors and Associated Equipment, vol. 384 Issue 1, pp. 179-184.*

(Continued)

*Primary Examiner*—David Porta
*Assistant Examiner*—David S. Baker
(74) *Attorney, Agent, or Firm*—Oblon, Spivak, McClelland, Maier & Neustadt, P.C.

(57) ABSTRACT

A two-dimensional ionising particle detector including a matrix of detecting fibers, each detecting fiber forming a pixel of the detector. Each detecting fiber is composed of a glass capillary filled with a liquid scintillator for which the chemical composition is chosen such that an average free path of primary scintillation photons is negligible compared with a diameter of the capillary. The detector is applicable, for example, to high resolution particle imagery.

8 Claims, 2 Drawing Sheets

OTHER PUBLICATIONS

Roberts, D.A. et al "Deuterated Liquid Scintillator (NE230) as a Fast Neutron Detector for Cold-Fusion and Other Research", Proceedings of the Nuclear Science Symposium and Medical Imaging Conference. vol. 1, pp. 197-200, XP010057947 ISBN: 0-7803-0513-2 Nov. 2, 1991.

Annis, P. et al "High-Resolution Tracking Using Large Capillary Bundles Filled with Liquid Scintillator", Nuclear Instruments & Methods in Physics Research, Section-A: Accelerators, Spectrometers, Detectors and Associated Equipment, Amsterdam, NL. vol. 449, No. 1-2, pp. 60-80, XP004208063 ISSN: 0168-9002 Jul. 2000.

* cited by examiner

PRIOR ART

US 7,238,951 B2

TWO-DIMENSIONAL IONISING PARTICLE DETECTOR

TECHNICAL DOMAIN AND PRIOR ART

The invention relates to a two-dimensional ionising particle detector.

For example, the invention is applicable to the domain of particle imagery with a high penetration capacity.

Particle imagery with a high penetration capacity (for example fast neutrons or gamma rays) requires detectors with a good resolution and a high stopping power.

For example, this type of detector is used for the fusion of deuterium (DD) or a mix of deuterium (D) and tritium (T) by inertial confinement using a power laser. Fusion of these hydrogen isotopes takes place in a volume with a 50 µm characteristic dimension. The fusion nuclear reaction is accompanied by release of a 14.1 MeV fast neutron for a DT mix or a 2.45 MeV fast neutron for a DD mix. Fast neutrons have sufficiently long free path to come out of the fuel. The neutronic image localises the area in which hydrogen isotopes burn. The neutronic image or the gamma image is formed either by a pinhole, or by a coded aperture such as a penumbra diaphragm or a ring. Detectors with a high detection capacity and capable of locating the interaction point of the particle are necessary for recording this image.

At the moment, two-dimensional ionising particle detectors are made by assembling thousands of plastic scintillator fibres, the length of each fibre typically being between 1 and 10 cm and forming one pixel of the detector. Such a detector is shown in FIGS. 1A and 1B. A set of plastic scintillator fibres 2 is held in a cylinder 1. Each plastic scintillator fibre 2 has approximately the same diameter D, for example 1 mm.

FIG. 2 shows a plastic scintillator fibre. It is composed of a plastic scintillator bar 3 with a high refraction index (typically of the order of 1.6) surrounded by a duct 4 with a lower optical index (typically of the order of 1.5). Incident particles to be detected P (neutrons, gamma radiation) follow a path parallel to the axis of the fibre and deposit their energy in the plastic scintillator. Backflow ions I are created and a fraction of the deposited energy is converted into primary photons Ph1, and then into secondary photons Ph2 and tertiary photons Ph3. The tertiary photons Ph3 form visible scintillation light that is guided as far as one end of the fibre where an image is recorded using a CCD (Charge Coupled Device) detector. Several centimeters of fibre are necessary to efficiently detect highly penetrating particles like fast neutrons.

For fibres longer than one centimeter, this technology limits the minimum fibre diameter to about 0.5 mm.

It is also known that sampling an image limits the final resolution in the source to twice the size of a pixel divided by magnification of the imagery system. Therefore in the event, magnification of an imagery system needs to be of the order of 200 to obtain spatial resolutions less than the size of the source, for example resolutions of the order of 5 µm. The measurement instrument then extends over long distances that may be more than about ten meters.

Moreover, a detector is made by the painstaking assembly of several thousand pixels one by one. The result is imperfections in the regular arrangement of pixels. Furthermore, the lack of stiffness of plastic scintillator fibres and their high expansion makes it impossible to guarantee precise colinearity between each fibre.

Furthermore, interaction of fast neutrons in a plastic scintillator is dominated by elastic diffusion on hydrogen. Thus, backflow ions I deposit their energy on a cylinder with a typical diameter of 1 mm while incident particles (neutrons, gamma radiation) have an energy of 14.1 MeV. Therefore another limitation of the spatial resolution in the source is the width of energy deposition (cylinder diameter) divided by the magnification.

Thus, the technology for manufacturing two-dimensional detectors according to known art limits the performances of the instruments in which these detectors are located. For example, in a matrix of plastic scintillator fibres with a diameter of 0.5 mm, the spatial resolution of the neutron detector is limited to 1.4 mm for 14.1 MeV neutrons and 1 mm for 2.45 MeV neutrons.

The invention does not have the disadvantages mentioned above.

PRESENTATION OF THE INVENTION

The invention relates to a two-dimensional ionising particle detector comprising a matrix of detecting fibres, each detecting fibre forming a pixel of the detector and including a scintillator to emit scintillation light, characterised in that each detecting fibre is composed of a glass capillary filled with a liquid scintillator for which the chemical composition is chosen such that the average free path of the primary scintillation photons is negligible compared with the diameter of the capillary.

Other characteristics and advantages of the invention will become clear after reading a preferred embodiment with reference to the attached figures among which:

The same marks denote the same elements in all figures.

DETAILED DESCRIPTION OF EMBODIMENTS OF THE INVENTION

Figure 1B:
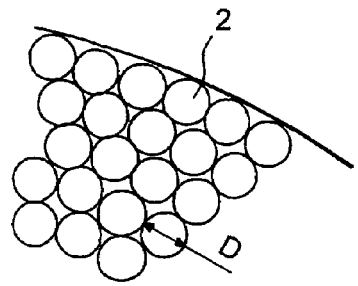
FIG. 1B shows a detailed view of FIG. 1A.
Figure 1A:
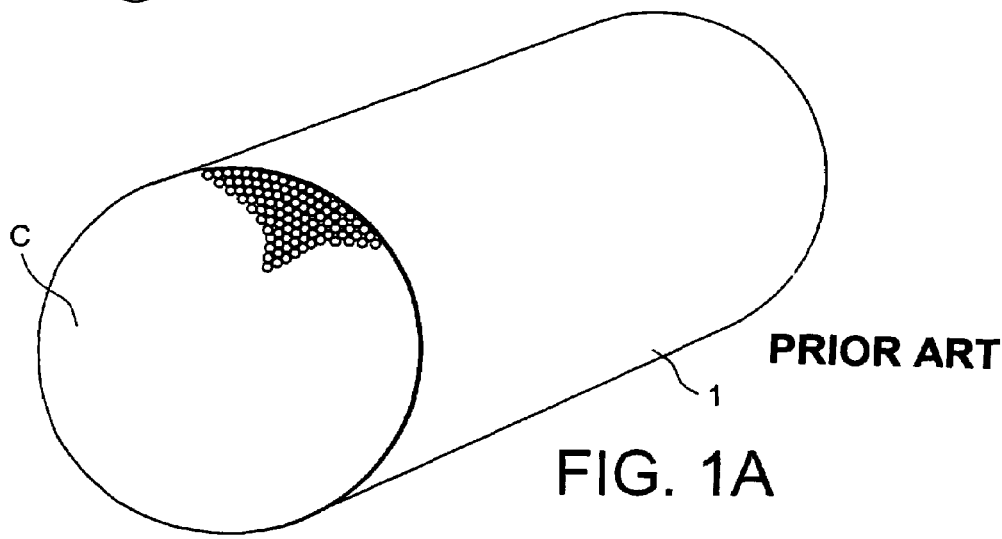
FIG. 1A shows a two-dimensional ionising particle detector according to prior art.
Figure 2:
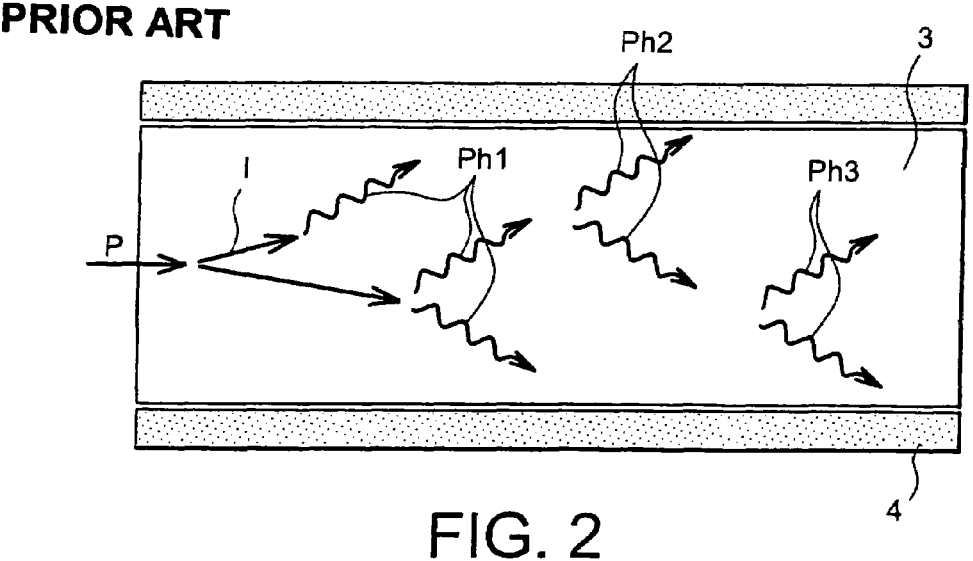
FIG. 2 shows the interaction of ionising particles to be detected in a plastic scintillator fibre according to prior art.
Figure 3:
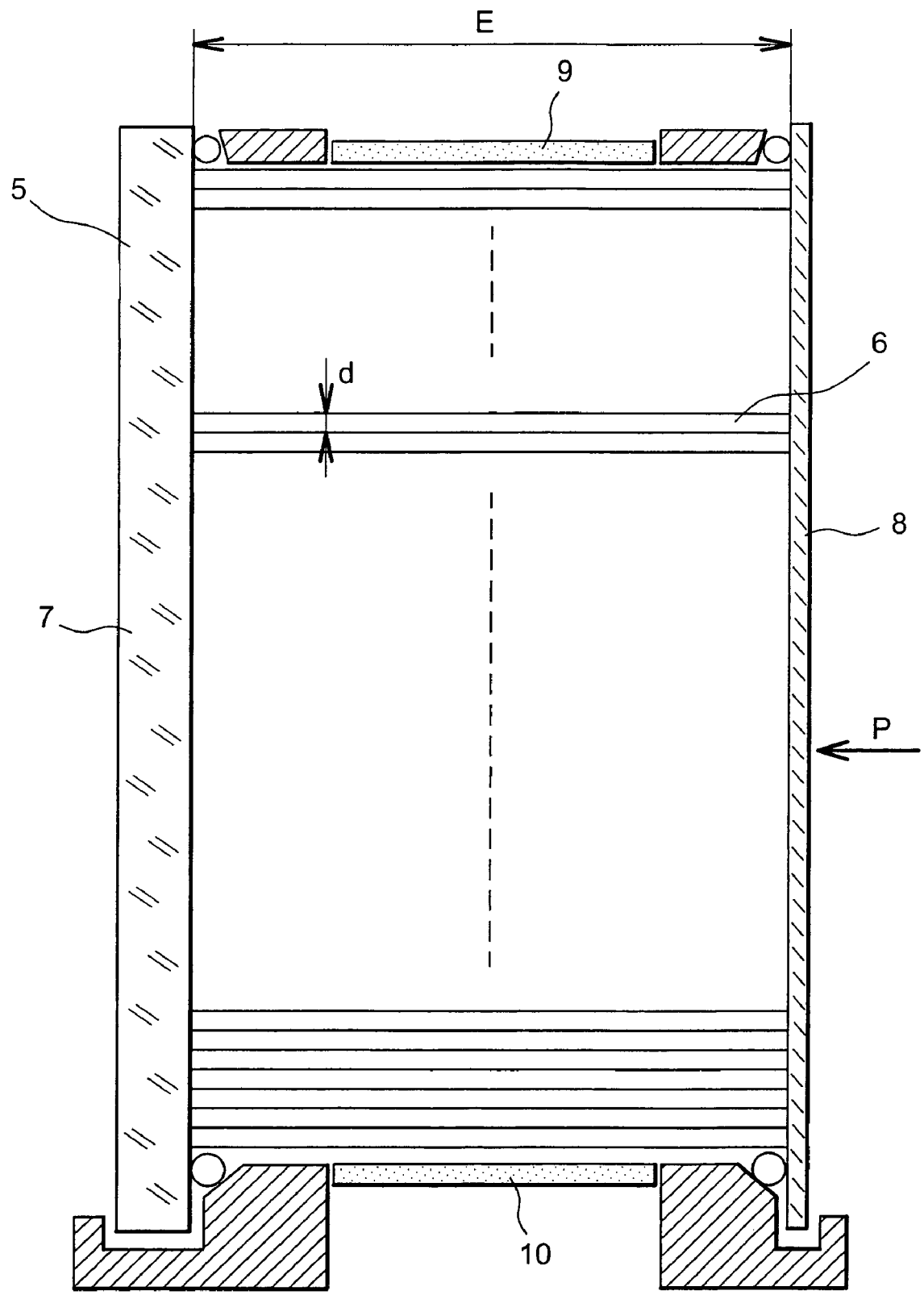
FIG. 3 shows a two-dimensional ionising particle detector according to a preferred embodiment of the invention.

FIG. 3 shows a two-dimensional ionising particle detector according to the invention.

The two-dimensional detector according to the invention comprises a capillary matrix 6 filled with a liquid scintillator. The capillary matrix 6 is placed in a vat 5. For example, the capillaries have an average diameter d less than or equal to 500 µm and can be as small as 20 µm. The refraction index of glass in the capillaries may for example be 1.49. The parallelism of capillaries is less than 100 micro-radians. The path of incident particles is parallel to the centre line of the capillaries.

For example, the liquid scintillator has a refraction index of 1.57. The chemical composition of the liquid scintillator is chosen such that the average free path of primary scintillation photons is negligible compared with the diameter of the capillary. For example, the wavelength of primary scintillation photons induced in the solvent will be 300 nm.

The liquid scintillator is either a binary liquid scintillator or a ternary liquid scintillator. For a binary liquid scintillator, the liquid scintillator comprises a first scintillator component that absorbs primary scintillation UV photons to emit secondary emission with a longer wavelength, for example 370 nm. A ternary scintillator liquid, apart from the first component, comprises a second scintillator component that absorbs the secondary emission emitted by the first component to in turn emit at a wavelength of between 400 nm and 500 nm, for example 420 nm. In both cases, the refraction index of the liquid scintillator and the refraction index of the glass that forms the capillary are chosen to guide scintillation light to an output end of the capillary.

The solvent that forms the capillary may for example be PXE (for phenyl-o-xylylethane). As a non-limitative example, the spatial resolution of the binary liquid scintillator is 6 µm and it emits at 370 nm and the spatial resolution of the ternary liquid scintillator is 7 µm and it emits at 420 nm. Binary and ternary scintillators may for example be components marketed under references EJ-399-05C2 and EJ-399-05C1 respectively.

Preferably, the liquid scintillator contains deuterium. The use of deuterium can advantageously reduce the width of the neutron energy deposition area about its interaction point, by a factor of 2. The liquid may also contain a solution of lithium or an element with an atomic mass greater than lithium. Moreover, the intensity of the scintillation emission will be divided by a factor e (e≈2.71828) in a few nanoseconds. This property makes it possible to select the neutron energy band per flight time. This property also makes it possible to differentiate neutrons from photons that usually accompany the production of neutrons. Due to its nature, the binary scintillator has a rise time of a few tens of pico-seconds. This property is essential, for example, for ultra-fast subnanosecond cinematographic applications.

The vat 5 comprises a first wall 7 fitted with a glass port transparent at the scintillation wavelength and a second wall 8 located in front of the first wall and made of a mirror reflecting at this wavelength. In the vat, the capillaries are placed between the window and the mirror and their axis is perpendicular to the mirror and the port. Particles to be detected penetrate into the detector through the mirror. Scintillation light is collected through the port 7. This light is emitted isotropically, and the fraction of light emitted that goes towards the mirror is reflected by the mirror and is returned to the output port.

Elastic membranes 9 and 10 on the top and bottom walls respectively of the vat, which are parallel to the axis of the capillaries, absorb thermal expansions of the scintillator.

For example, the detectors matrix has a section of the order of 100×100 mm$^2$ and a thickness E that may vary from 10 to 50 mm. It is made from a single block by multiple assembly of macro bundles containing elementary bundles. Large section monolithic detectors can be made with this technique. The capillaries matrix is preferably made on a thickness much greater than the thickness required, so as to assure good colinearity between capillaries (for example less than 100µradians).

A digital embodiment example of a detector used to acquire the neutronic image of a 1 mm diameter capsule filled with deuterium and imploded by a 30 kJ laser is given below. The capillaries matrix is a block with a side dimension of 100 mm and 50 mm thick. Each capillary has a diameter of 250 µm. The liquid scintillator with an optical index of 1.57 contains 98% deuterium. Its scintillation efficiency is 80% compared with anthracene and its decay constant is 3 ns. The stainless steel vat is closed by a mirror and a glass port. Four elastic membranes enable thermal expansion of the scintillator.

The invention claimed is:

1. A two-dimensional ionising particle detector comprising:
   a matrix of detecting fibers, each detecting fiber forming a pixel of the detector and including a scintillator to emit scintillation light,
   wherein each detecting fiber comprises a glass capillary filled with a liquid scintillator for which a chemical composition is chosen such that an average free path of primary scintillation photons is negligible compared with a diameter of the capillary.

2. A two-dimensional ionising particle detector according to claim 1, wherein the capillaries are placed in a vat comprising a first wall fitted with a glass port transparent at a wavelength of the scintillation light and a second wall located in front of the first wall and comprising a mirror reflecting at the wavelength, ionising particles penetrating into the detector through the mirror.

3. A two-dimensional ionising particle detector according to claim 2, wherein the vat comprises a top wall and bottom walls that comprise elastic membranes to absorb thermal expansion.

4. A two-dimensional ionising particle detector according to claim 1, wherein the liquid scintillator is a binary liquid scintillator.

5. A two-dimensional ionising particle detector according to claim 1, wherein the liquid scintillator is a ternary liquid scintillator.

6. A two-dimensional ionising particle detector according to claim 1, wherein a solvent used in the liquid scintillator includes PXE.

7. A two-dimensional ionising particle detector according to claim 1, wherein the liquid scintillator comprises deuterium.

8. A two-dimensional ionising particle detector according to claim 1, wherein the capillaries have a diameter between 20 µm and 500 µm and a length between 10 and 50 mm, and the matrix has a section approximately equal to 100×100 mm$^2$.

* * * * *